United States Patent [19]

Larsen

[11] 4,135,724

[45] Jan. 23, 1979

[54] GAS TANK SUPPORT AND CONTROL PANEL

[75] Inventor: Glenn L. Larsen, Bloomington, Minn.

[73] Assignee: The Toro Company, Minneapolis, Minn.

[21] Appl. No.: 878,788

[22] Filed: Feb. 17, 1978

[51] Int. Cl.² .............................................. B23B 5/34
[52] U.S. Cl. ................................... 280/5 R; 137/343; 220/69; 248/154
[58] Field of Search ............... 248/19, 27.1, 133, 139, 248/143, 146, 152, 154; 220/69; 137/343, 351, 353; 280/5 R, 5 A, 5 F

[56] References Cited

U.S. PATENT DOCUMENTS

| | | | |
|---|---|---|---|
| 1,358,783 | 11/1920 | Rebours | 137/353 X |
| 1,504,751 | 8/1924 | Green | 280/5 A |
| 2,463,780 | 3/1949 | Korrol | 248/346 |
| 2,615,238 | 10/1952 | Highwood | 248/154 X |
| 2,930,562 | 3/1960 | King | 248/152 |
| 3,136,523 | 6/1964 | Munroe | 248/27.1 X |
| 3,353,615 | 11/1967 | Nekimken | 248/146 X |
| 3,989,155 | 11/1976 | Conklin | 220/69 X |

FOREIGN PATENT DOCUMENTS 294132  3/1932  Italy ......................................... 137/353

Primary Examiner—William H. Schultz
Attorney, Agent, or Firm—Merchant, Gould, Smith, Edell, Welter & Schmidt

[57] ABSTRACT

A bracket for centrally and accessibly mounting various engine controls constituting components of a snowblower, power lawn mower, or similar vehicle, and for diverting any gasoline spilled during the filling of the gasoline tank of the vehicle from electrical connections of those controls.

6 Claims, 2 Drawing Figures

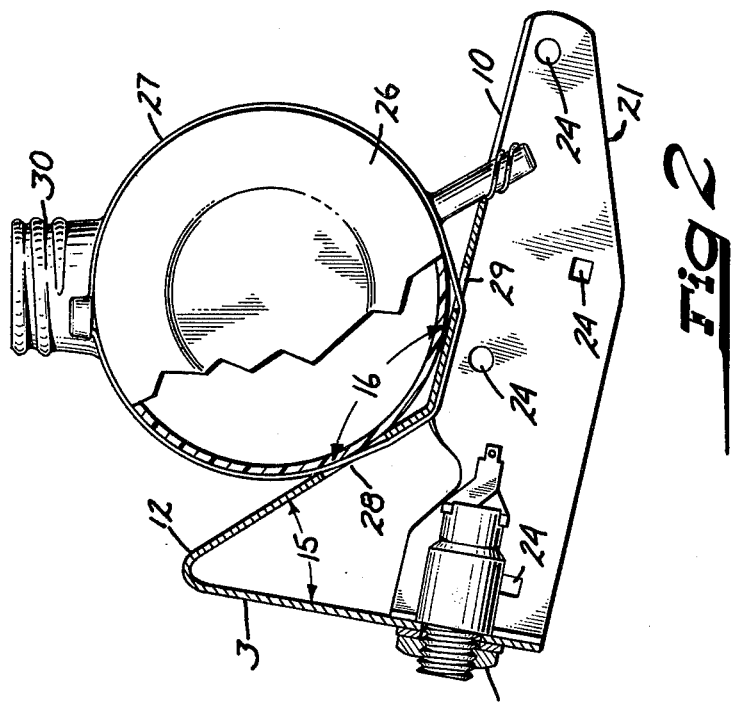
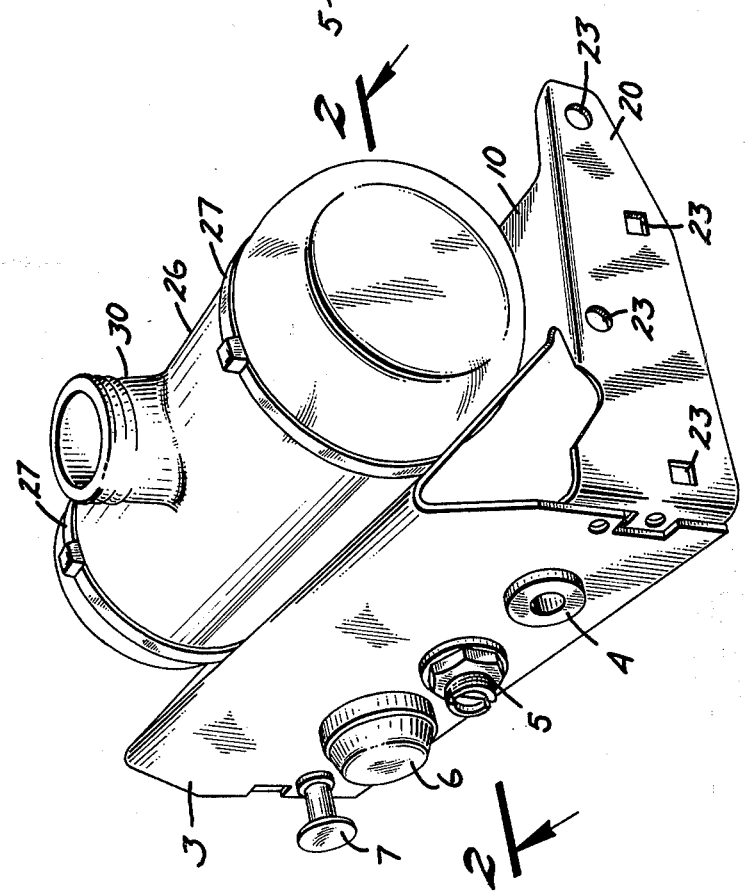

GAS TANK SUPPORT AND CONTROL PANEL

BACKGROUND OF THE INVENTION

The invention of this application relates to structure of equipment driven by internal combustion engines, and, more specifically, to a bracket used in mounting controls and a fuel reservoir for such equipment. Equipment of the type above mentioned has traditionally, and of necessity, included various engine controls to effect operation. Typical of these controls are recoil starters, key starts, primers, and chokes. In the prior art, these controls have often been positioned locally at various places about the engine without a central location being provided for their mounting. Provision of such a configuration, however, facilitates their location and ready accessibility to a user.

Similarly, ready accessibility of the gas tank of the vehicle is a desirable characteristic. In the present invention, the gas tank and controls are mounted proximate one another. When, however, the gas tank is positioned in a location near engine controls, it is desirable to provide some isolation between the gas tank and electrical connections of the controls in addition to the isolation provided by standard electrical insulation. The present invention provides such isolation.

SUMMARY OF THE INVENTION

The invention of the present application provides for central and accessible mounting of engine controls and a gas tank for a snowthrower, power lawnmower, or similar equipment by providing a tank support and control panel mounting bracket for connection between the extensions of a conventional operator handle used to direct the equipment. The bracket includes a flat elongated control mounting panel for mounting of engine controls. Spaced from and generally orthogonal to the control mounting panel as a part of the bracket is an elongated gas tank supporting panel on which a tank may be mounted. The control panel and the gas tank supporting panel are separated by an elongated spill diverting panel which runs obliquely between the control mounting panel and the gas tank supporting panel. The spill diverting panel forms an acute dihedral angle with the control mounting panel and an obtuse dihedral angle with the gas tank supporting panel and provides additional support for cradling a portion of elongated cylindrical gas tank.

In certain embodiments, the bracket further includes flat elongated mounting flanges generally perpendicular to the control mounting, gas tank supporting, and spill diverting panels at opposite ends thereof for mounting the bracket on an appropriate piece of equipment.

With such a construction, the gas tank may be mounted in contact with the spill diverting and gas tank supporting panels with the controls positioned on the control mounting panel beneath the spill diverting panel so that gasoline inadvertently spilled during filling of the gas tank is diverted from contact with the electrical connections of the controls.

The advantages of my invention and features of various specific embodiments thereof will become apparent upon consideration of the drawings, description of the preferred embodiment, and claims.

BRIEF DESCRIPTION OF THE DRAWINGS

FIG. 1 is a perspective view of the invention with a generally cylindrical gas tank mounted thereto by spaced mounting belts.

FIG. 2 shows a side cut-away view along line 2—2 of FIG. 1, again with a generally cylindrical gas tank mounted thereto by spaced mounting belts.

DESCRIPTION OF THE PREFERRED EMBODIMENT

Referring to the Figures, wherein like reference numerals denote like elements, a control mounting panel 3 is shown in a generally vertical position. To that panel are mounted a recoil starter handle conduit 4, a key start assembly 5, a primer control 6, and a choke control 7. Extensions of the key start 5, primer 6, choke 7 and the recoil starter cable which passes through the conduit 4, all pass beneath a spill diverting panel 12 and a gas tank supporting panel 10 as shown in FIG. 2. Elements 4, 5, 6 and 7 are illustrative of controls which might be placed on the panel, it being understood that the bracket of the present invention might well be used with other control mechanisms.

The control mounting panel 3 and the spill diverting panel 12 intersect to form a first dihedral angle 15, and the spill diverting panel 12 and gas tank support panel 10 intersects to form second dihedral angle 16. In the preferred embodiment shown in the figures, gas tank support panel 10, spill diverting panel 12, and control mounting panel 3 may be constructed of a single piece of sheet metal with radiused bends between the panels which define dihedral angles 15 and 16. This forms a smooth and continuous piece with substantial rigidity which serves to reinforce and stiffen the entire bracket and also adds structural integrity to the operator handle to which it may be mounted.

At either end of, and perpendicular to, the control mounting panel 3 and the gas tank support panel 10, are affixed mounting flanges 20 and 21. Drilled within each flange are four mounting holes identified by 23 and 24. Mounting flanges 20 and 21 serve to provide a method by which the overall bracket may be mounted to spaced apart extending legs of a conventional operator handle not shown in the figures. In the preferred embodiment shown in these figures, mounting flanges 20 and 21 are formed from a unitary piece of sheet metal which is also formed to provide panels 3, 10 and 12. As shown in the figures, mounting flanges 20 and 21 extend outward from gas tank support panel 10 and are formed downward at a right angle thereto. Each mounting flange also has a flanged edge which mates with an edge of control mounting panel 3, as best shown in FIG. 1. At the places of contact between these flanged edges and the edges of control mounting panel 3, the bracket is provided with suitable holes for machine screws or other fasteners. The fastening of mounting flanges 20 and 21 to control mounting panel 3 at these points creates a solid brace of triangular shape between the legs defined by panels 3 and 12.

While in the embodiment shown in the figures, fasteners are used to fasten control panel 3 to mounting flanges 20 and 21, the structure could as well be made by originally constructing the flanges as extensions of control panel 3, forming right angle bends in the flange extensions at the edge of control panel 3, and using fasteners to fasten the flanges at the edges of gas tank supporting panel 10.

When the mounting bracket of the present invention is mounted to a vehicle, it is oriented so that the gas tank supporting panel 10 is inclined slightly downwardly. A gas tank 26 of elongated cylindrical construction is mounted to the mounting bracket as shown in the figures. Any of a number of structures may be employed for mounting the gas tank 26 to the mounting bracket. In the specific embodiment shown in the figures, a pair of mounting belts 27 pass around the tank perpendicular to its axis through spaced apertures 28 in spill diverting panel 12 and apertures 29 in gas tank support panel 10. In one specific embodiment of the invention which was constructed, these were locking plastic mounting belts, but conventional hose clamps or other mounting means could as well be employed.

The gas tank 26 is mounted so that it fits securely against the panels and is cradled at second dihedral angle 16, as shown best in FIG. 2. Gas tank 26 preferably has a filling opening located centrally along its axis and extending cylindrically along an axis perpendicular thereto. Opening 30 may be threaded to accept a closure cap (not shown) to retain gasoline once the tank has been filled. In the preferred embodiment, central filling opening 30 is oriented so that it is positioned at the top of the tank.

When refilling the gas tank 26, gasoline is poured into the tank through the central filling opening 30. Should gasoline miss the opening 30 while it is being poured and run down the sides of gas tank 26, it will normally be diverted from electrical connections positioned immediately beneath the gas tank by the spill diverting panel 12 and the gas tank supporting panel 10. Such run off will normally either be channeled to the sides by the trough created by second dihedral angle 16 or will run off the lower end of the gas tank supporting panel 10. In either case, the gasoline will be diverted well clear of electrical connections.

From the foregoing, it is apparent that the present invention provides a gas tank support and control panel mounting bracket of substantial structural integrity. Also, the bracket of the present invention may readily be fabricated from a single piece of sheet metal appropriately formed. When completed, the bracket provides a stable and well defined structural support for a gas tank and equipment controls in a central and accessible location on a piece of power equipment, at the same time inherently providing a spill diverting function for the gas tank. In addition to these advantages, the bracket also provides a stiffening support for the operator control handle of the equipment.

Although the bracket has been described above in terms of specific embodiments and preferred constructions, it will of course be understood that the invention is defined in the appended claims, and many alternatives and modifications within the spirit and scope of the invention as defined by these claims will occur to those of skill in the art.

What is claimed is:

1. A gas tank support and control panel mounting bracket for use on a snowthrower, power lawn mower, or like power equipment, comprising:
   a flat elongated control mounting panel for mounting various engine controls;
   an elongated gas tank supporting panel generally orthogonal to and spaced from said control mounting panel for mounting a gas tank;
   an elongated spill diverting panel intermediate said control panel and gas tank supporting panel and positioned obliquely with respect thereto, one side of said spill diverting panel defining an acute dihedral angle with respect to said control mounting panel, the spill diverting panel also defining an obtuse dihedral angle with respect to said gas tank support panel, with said support panel and said spill diverting panel combining to provide a support structure for the gas tank;
   connective means interconnecting said control mounting, gas tank supporting and spill diverting panels for maintaining their positional relationship with respect to one another; and
   mounting means carried by said bracket for mounting said bracket to a unit of power equipment for use therewith..

2. The bracket of claim 1 wherein the acute and obtuse dihedral angles defined by said panels have parallel vertices.

3. The bracket of claim 2, an elongated generally cylindrical tank carried by said bracket with a cylindrical surface thereof in contact with said gas tank supporting and spill diverting panels, and means for affixing said tank to said bracket in contact therewith.

4. The bracket of claim 1 wherein said panels are formed from a single piece of sheet metal with radiused bends therein proximate said acute and obtuse dihedral angles.

5. The bracket of claim 2 wherein said connective means comprises a pair of flat elongated mounting flanges positioned orthogonal to said panels at the ends thereof and connected to at least two of said panels to provide support therefor.

6. The bracket of claim 5 wherein said flanges are formed integrally with said panels as a single piece of sheet metal and connected to one of said panels by radiused bends at substantially right angles thereto.

* * * * *